US010936557B2

(12) United States Patent
Sengupta et al.

(10) Patent No.: US 10,936,557 B2
(45) Date of Patent: Mar. 2, 2021

(54) RELATIONAL DATABASE SCHEMA GENERATION

(71) Applicant: INTERNATIONAL BUSINESS MACHINES CORPORATION, Armonk, NY (US)

(72) Inventors: Sautam Sengupta, Behala Kolkata (IN); Santanu Bandyopadhyay, Kolkata (IN); Ramesh Chandra Pathak, Bangalore (IN); Suryanarayana Rao, Bangalore (IN); Ramesh Kumar Goel, Balbir Nagar (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 192 days.

(21) Appl. No.: 16/046,549

(22) Filed: Jul. 26, 2018

(65) Prior Publication Data
US 2020/0034461 A1   Jan. 30, 2020

(51) Int. Cl.
*G06F 15/16*    (2006.01)
*G06F 16/21*    (2019.01)
(Continued)

(52) U.S. Cl.
CPC .......... *G06F 16/212* (2019.01); *G06F 16/284* (2019.01); *G06F 40/205* (2020.01);
(Continued)

(58) Field of Classification Search
None
See application file for complete search history.

(56) References Cited

U.S. PATENT DOCUMENTS 5,365,433 A * 11/1994 Steinberg ............... G06F 16/00
704/9
6,631,519 B1   10/2003 Nicholson et al.
(Continued)

FOREIGN PATENT DOCUMENTS

| EP | 1367503 A1 | 12/2003 |
| WO | 2006064383 A2 | 6/2006 |
| WO | 2007038408 A3 | 4/2007 |

OTHER PUBLICATIONS

Elbendak et al, Parsed use case descriptions as a basis for object-oriented class model generation, 2011, pp. 1209-1223 (Year: 2011).*
(Continued)

*Primary Examiner* — Alex Gofman
(74) *Attorney, Agent, or Firm* — Michael O'Keefe; Matthew M. Hulihan; Heslin Rothenberg Farley & Mesiti PC

(57) ABSTRACT

Relational database schema generation includes obtaining an input requirements specification for a relational database to be generated, interpreting text characters of the requirements specification as values of a predefined character encoding, parsing the interpreted text characters and identifying complete sentences of the requirements specification, identifying, using an input dictionary that specifies combinations of character values of the predefined character encoding, proper nouns in the identified complete sentences and common nouns in the identified complete sentences, and generating a relational database schema script for the relational database, the generating including indicating the identified proper nouns of the complete sentences as entities of the relational database and indicating the identified common nouns of the complete sentences as attributes of those entities.

19 Claims, 11 Drawing Sheets

(51) Int. Cl.
*G06F 16/28* (2019.01)
*G06F 40/205* (2020.01)
*G06F 40/242* (2020.01)
*G06F 40/253* (2020.01)
*G06F 40/295* (2020.01)

(52) U.S. Cl.
CPC .......... *G06F 40/242* (2020.01); *G06F 40/253* (2020.01); *G06F 40/295* (2020.01)

(56) References Cited

U.S. PATENT DOCUMENTS

| | | |
|---|---|---|
| 7,505,993 B2 | 3/2009 | Chan et al. |
| 7,562,357 B2 | 7/2009 | Tamma et al. |
| 7,653,652 B2 | 1/2010 | Kagalwala |
| 7,844,570 B2 | 11/2010 | Netz et al. |
| 8,041,687 B2 | 10/2011 | Chen et al. |
| 8,452,808 B2 | 5/2013 | Dove et al. |
| 8,639,712 B2 | 1/2014 | Schmeink et al. |
| 2005/0050069 A1 | 3/2005 | Vaschillo et al. |
| 2006/0117057 A1 | 6/2006 | Legault et al. |
| 2007/0073765 A1 | 3/2007 | Chen |
| 2008/0065653 A1 | 3/2008 | Shneur et al. |
| 2008/0126389 A1 | 5/2008 | Mush et al. |
| 2009/0049021 A1 | 2/2009 | Chitrapura et al. |
| 2010/0287185 A1 | 11/2010 | Cras et al. |
| 2012/0005241 A1 | 1/2012 | Ortel |
| 2013/0018902 A1* | 1/2013 | Vickers ................. G06F 16/211 707/756 |
| 2013/0124578 A1 | 5/2013 | Vangati et al. |
| 2013/0339399 A1 | 12/2013 | Dorris et al. |
| 2014/0208303 A1 | 7/2014 | Asayag |
| 2015/0193477 A1 | 7/2015 | Dumant et al. |
| 2017/0060972 A1* | 3/2017 | McHugh ............... G06F 16/258 |
| 2018/0341689 A1* | 11/2018 | Zhang .................. G06F 16/258 |

OTHER PUBLICATIONS

Mell, Peter, et al., "The NIST Definition of Cloud Computing", NIST Special Publication 800-145, Sep. 2011, Gaithersburg, MD, 7 pgs.

* cited by examiner

RELATIONAL DATABASE SCHEMA GENERATION

BACKGROUND

In any kind of application relying on a relational database, it is often necessary to generate a schema for the relational database based on specified 'requirements'. Requirements are parameters of the business specification for which the schema is to be generated, e.g. business information parameters for which the schema is required. The relational database schema is a stepping stone to building the database that is to store the transactional data of the application. To develop database-specific relational schema, there is often a dependence on technical team members of a certain skill set who can analyze the requirements and develop the relational database schema specific to the desired database.

SUMMARY

Shortcomings of the prior art are overcome and additional advantages are provided through the provision of a computer-implemented method. The method obtains an input requirements specification for a relational database to be generated. The method interprets text characters of the requirements specification as values of a predefined character encoding. The method parses the interpreted text characters and identifies complete sentences of the requirements specification. The method identifies, using an input dictionary that specifies combinations of character values of the predefined character encoding, proper nouns in the identified complete sentences and common nouns in the identified complete sentences. The method generates a relational database schema script for the relational database, the generating including indicating the identified proper nouns of the complete sentences as entities of the relational database and indicating the identified common nouns of the complete sentences as attributes of those entities.

Further, a computer program product including a computer readable storage medium readable by a processing circuit and storing instructions for execution by the processing circuit is provided for performing a method. The method obtains an input requirements specification for a relational database to be generated. The method interprets text characters of the requirements specification as values of a predefined character encoding. The method parses the interpreted text characters and identifies complete sentences of the requirements specification. The method identifies, using an input dictionary that specifies combinations of character values of the predefined character encoding, proper nouns in the identified complete sentences and common nouns in the identified complete sentences. The method generates a relational database schema script for the relational database, the generating including indicating the identified proper nouns of the complete sentences as entities of the relational database and indicating the identified common nouns of the complete sentences as attributes of those entities.

Yet further, a computer system is provided that includes a memory and a processor in communication with the memory, wherein the computer system is configured to perform a method. The method obtains an input requirements specification for a relational database to be generated. The method interprets text characters of the requirements specification as values of a predefined character encoding. The method parses the interpreted text characters and identifies complete sentences of the requirements specification. The method identifies, using an input dictionary that specifies combinations of character values of the predefined character encoding, proper nouns in the identified complete sentences and common nouns in the identified complete sentences. The method generates a relational database schema script for the relational database, the generating including indicating the identified proper nouns of the complete sentences as entities of the relational database and indicating the identified common nouns of the complete sentences as attributes of those entities.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1A:
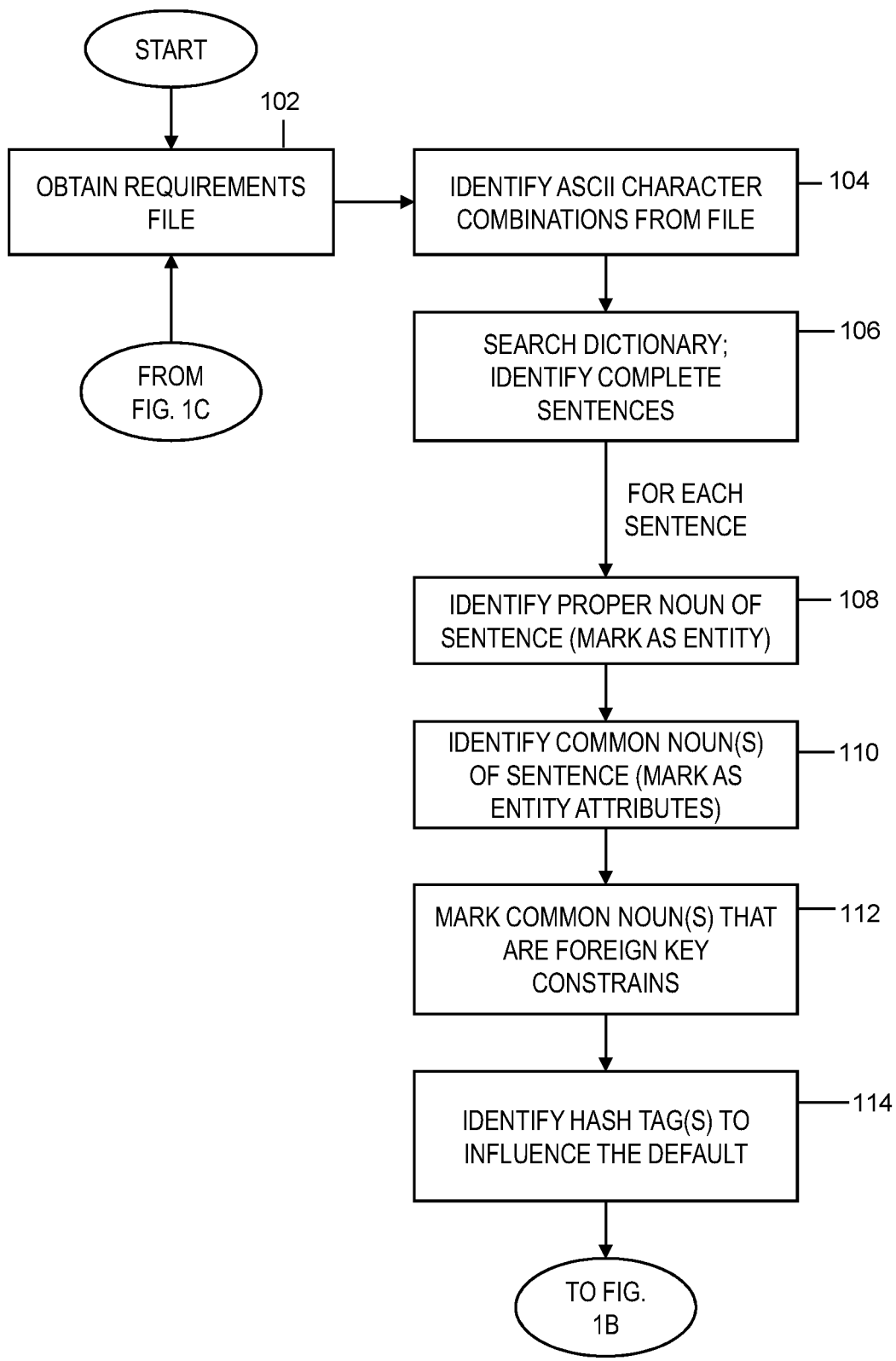
FIGS. 1A-1C depict an example sequence diagram for relational database schema generation, in accordance with aspects described herein.

Described herein are approaches for relational database schema generation. In some aspects, this is performed based on interpreting a requirements specification input file and leveraging a dictionary of character encodings representing entities familiar to a type, industry, application, etc. of the database that is desired.

Some existing approaches generate a relational database schema from an Enhanced Entity Relationship (EER) model. A developer can generate the relational database schema script by taking the EER/ERD (Entity Relationship Diagram) as input. However, this uses a particular skill set of the specific tool and is not done without team members having knowledge in using the tool. Moreover, it is not sufficient for team members to possess only the aforementioned knowledge; they should also have knowledge of Enhance Entity Relationships, otherwise they will not generate the input EER/ERD (from requirements gathered by Sales team for instance) necessary to generate the appropriate relational database schema. Consequently, under this approach, the relational database schema is not developed until the team has the required competencies.

In another approach, the relational schema script is developed directly from high level requirements. This approach follows the systems development lifecycle (SDLC) and develops the relational database schema from the high level requirements by, i.e., (i) analyzing the high level requirements; (ii) preparing the entity relationship diagrams from the requirements gathered by the sales team; (iii) generating the relational schema script once the ERD is ready; then (iv) testing the developed schema and creating the relational tables for the particular schema. However, such a process is normally disadvantageous at least because it is time-consuming and costly.

Hence, current approaches generate the relational schema script only if the technical team has developed the entity relationship diagram by analyzing the requirements document sent by from the requirements gathering team. They lack rapid generation of the schema directly from the input requirements.

Aspects described herein provide an approach in which relational database schema, regardless of its complexity, can be rapidly generated from the requirements specification captured by the requirements gathering team. It is not dependent on technical team members with particular competencies in the given application(s) for which the database is intended to service. According to aspects described herein, a database dictionary-based ASCII (as one example; other examples are possible) interpreter analyzes the ASCII of the captured requirements file from, e.g., the requirements gathering team, and generates the corresponding bytecode for the schema. The bytecode can be synthesized by a Relational Schema Generator Module to generate the script of the relational database schema. This script can be executed based on server information to create the entire, complex relational tables along with their column and proper datatyping for the particular schema.

Provided therefore is light-weight, self-contained ASCII-based relational database schema generation, accomplished directly from the requirements gathered in plain text, in any language, with accurate generation of entities, attributes, and relevant referential integrity (foreign key) constraints pertaining to the underlined data model. In particular examples, "entities" refer to the database tables, "attributes" refer to the table columns (and data types for those columns), and "referential integrity constraints" are the foreign key attributes/constraints as between tables.

Further provided is an iterative aspect of relational database schema generation, in which the generating is iterated any number of times after updating/refining the requirements, in order to meet the desired requirements. A user can see based on a generated initial schema whether the initial schema needs to be tweaked, and can then tweak the requirements file accordingly. The system can automatically analyze the tweaked requirements file and produce an updated schema script.

Yet further, a hash tag hints feature may be supported to influence the real-time generation of the schema script based, e.g., on combinations of the dictionary weighted words and hints provided by the hash tags in the requirements specification.

Figure 1B:
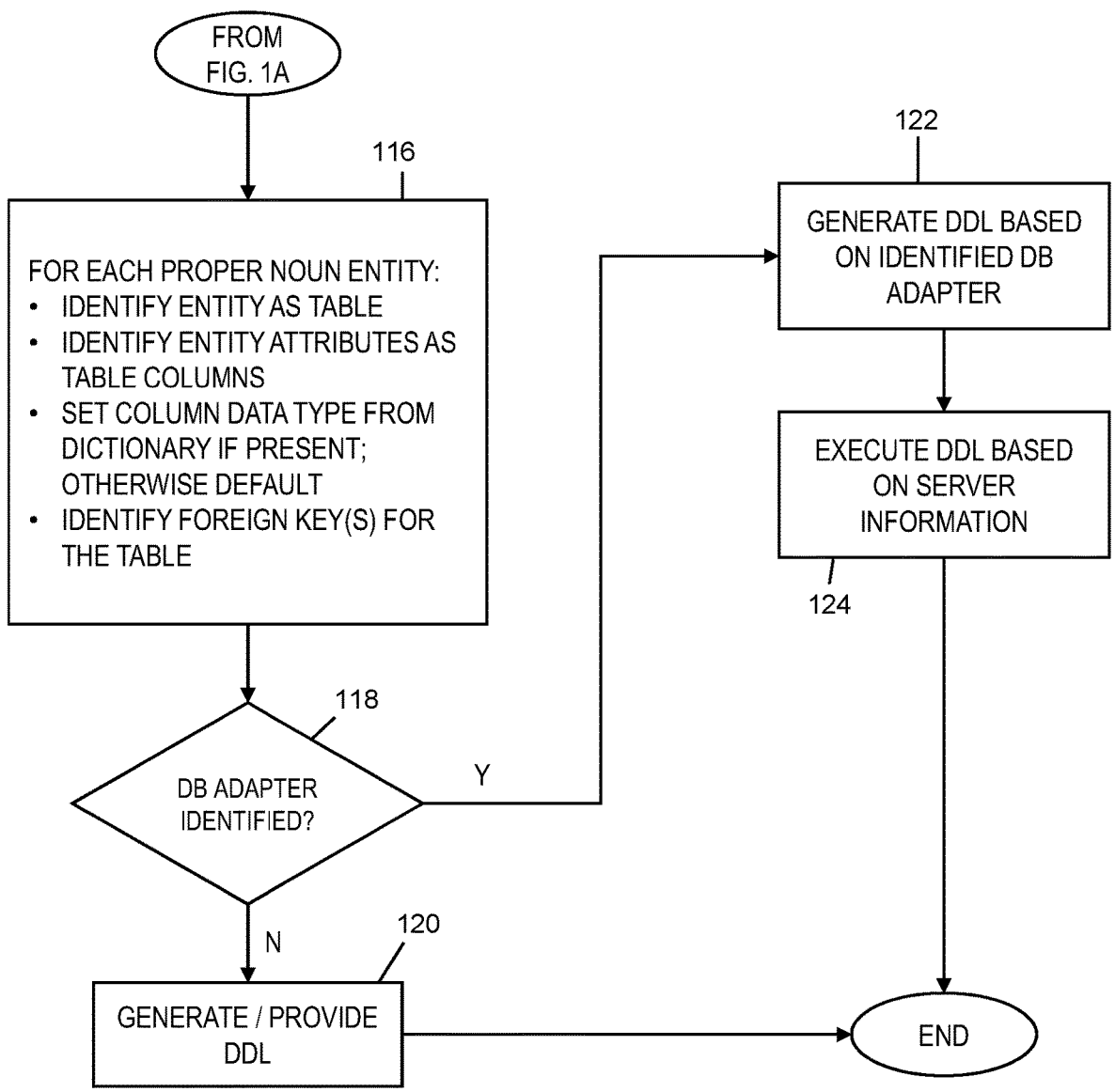
Figure 1C:
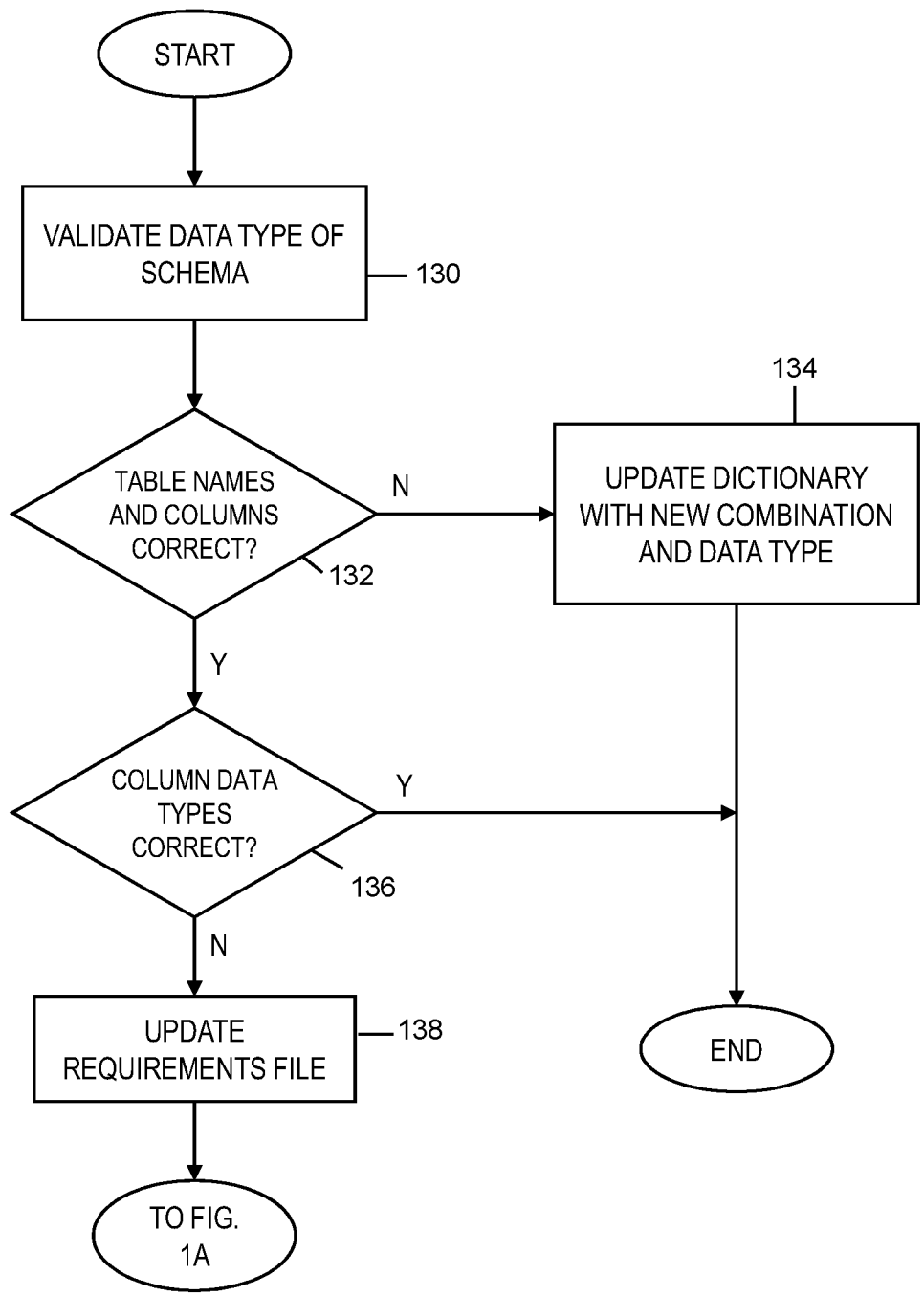

FIGS. 1A-1C depict an example sequence diagram for relational database schema generation, in accordance with aspects described herein. Aspects of the processing of FIGS. 1A-1C may be performed in whole or in part by one or more computer systems described herein.

A sequence begins by obtaining a requirements file 102, which in one example is a text document containing 'sentences' having the Requirements specification for the database. The requirements file is typically provided by a requirements gathering team. Then, in general, a schema for a relational database is generated based on this initial input text specification of the requirements. The requirements may be provided in any language.

Aspects of the relational database schema generation are described with reference to two primary concepts—a Logical Database specific ASCII Interpreter and a Relational Schema Generator. ASCII (American Standard Code for Information Interchange) is a character encoding standard, and is used herein only by way example. Aspects described herein apply to any desired character encoding, as ASCII is just one example standard character encoding.

Referring initially to a sequence performed by the Logical DB Specific ASCII Interpreter, the sequence reads the input requirements file and generates the ASCII value of each character present in the text file for each sentence to identify the ASCII character combinations from the file (104). A database specific dictionary for that character encoding (ASCII in this example) is searched and leveraged to identify character/word combinations that are complete sentences (106). The dictionary may be industry-specific in that it can include words, character combinations, etc. that are tailored, expected, or commonly seen in that specific industry or field. The automobile, procurement, and supply chain industries, as examples are likely use databases that differ from each other because requirements, vocabulary, type of information housed, and other features may be different among those different industries.

Thus, predefined dictionaries (that may be updated over time as described herein) may be maintained, and these can each serve as a dictionary that is searched (106) to inform and/or validate entities, datatypes, etc. that are ascertained from requirements specification as described herein.

Then, for each complete sentence identified (invalid or incomplete sentences may be ignored), the sequence identifies the proper noun of the sentence (108) (marking it as an entity to be a table of the database) and identifies the common noun(s) (110) (marking them as attributes of that entity) of the sentence. Space characters or other characters may be used to separate words in the requirements specification, and therefore serve as delimiters in parsing the characters of the file. It is also noted that such nouns can be identified relying on the applicable ASCII dictionary. For instance, frequent proper and/or common nouns for such a database may be indicated as such in the dictionary, which can inform the identification (108, 110) of these components of the requirements specification. The sequence also marks common noun(s) that are foreign key constraints (112), which is done in this example based on checking whether each identified common noun is referenced in any other sentences of the interpreted requirements specification. As a result, based on the whether the ASCII combinations (i.e. combinations of ASCII characters to form words) are proper nouns or common nouns, the sequence identifies the entities, their responsibilities, and their references with other entities for any the requirements specification.

In addition, hash tags (or other delimiters) may be used in the input requirements specification to influence default identifications and/or define entities, attributes, references to other entities, datatypes for attributes, and so on. The sequence therefore identifies these hash tags to (potentially) influence the default behavior (114) that would occur if the hash tags were not included.

The sequence continues (to FIG. 1B) with aspects performed by a relational database schema generator. The sequence performs, for each proper noun: (i) identifying that entity as a table, (ii) identifying the entity attributes (i.e. common nouns appearing in the same sentence as that proper noun) as columns for that table, (iii) setting column data types (e.g. from what is specified in the dictionary for the attributes, by using a default datatype such as 'char', or by reading a hashtag/hint specified in the requirements), and (iv) identifying any foreign key constraints for that table (i.e. based on where common nouns of that sentence are referenced in other sentences) (116). The sequence continues by determining whether a database adapter (adapter to use for executing the schema script for a particular server/database type) is identified (118). If server credentials are known or specified as part of the requirements specification or otherwise, the kind of adapter to use for the server may be identifiable. Such adapters perform the actual schema generation for the server itself. An adapter may be a software module that takes standard data definition language (DDL) input (which may be generated as described herein) and builds the specific schema for the particular server to which the adapter corresponds.

Thus, a set of adapters may exist and, in one example, the appropriate adapter may be predicted or ascertained based on the dictionary used. The sequence can either generate the DDL for the schema, or, alternatively, the server information/credentials, if known, can inform of the specific server for generation of the schema in/on that server using the adapter. In the case that a server is known, a check can be made as to what the proper adapter is for that server. The adapter can be loaded and the schema generated on the server itself.

If the database adapter is not identified/identifiable (118, N), the sequence proceeds by generating/providing DLL (120), which may later be used in building the schema for a particular server. Otherwise (118, Y), for instance server credentials are provided, the adapter is identified, the DLL is generated based on the identified database adapter (122) and executed based on the server information and adapter (124), for instance is executed on the server to build the database tables with proper attributes, datatypes, and foreign key relationships.

In some aspects, the DDL execution is performed as a convenience for a user to view the tables, columns, etc. that are produced for the schema in order to verify that everything is satisfactory. If not everything is satisfactory, then in some examples the user modifies the requirements file and reruns the process. Typically, if the DLL generates a satisfactory database, the user can send the DDL to the database administrator for DLL execution to generate the tables, etc., using the adapters, on the database server(s).

Schema validation and machine learning can also be provided, for instance as a slave process that runs concurrent with the sequence of FIGS. 1A and 1B. The schema validation refines/updates the predefined specifications in the dictionary, for instance new entity/attribute combinations and/or data types. As the system is used over time, there may be additions or other changes to make to the dictionary. Data types may be absent or incorrect, for instance.

Referring to FIG. 1C as an example schema validation and machine learning process, the sequence of FIG. 1C validates the data types of the schema (130) and inquires whether table names are correct (132). This may be based on a comparison to what is specified in the dictionary and/or with the assistance of a responsible user, for example. If table name and/or column(s) are not correct (132, N), then the process updates the dictionary with the new table/column(s) combination and the subject data types (134). The update can add the specified column(s) and indicate they are proper column(s) to have in that table, for instance. Additionally or alternatively, the requirements specification is updated by a user to correctly identify the table names/columns.

If instead at 132 the table names and columns are correct (132, Y), the process determines whether the column data types are correct (136). If so (136, Y), the process ends, as the schema is correct. Otherwise, (136, N), the requirements specification file is updated (138), for instance by a user, to fix the issue. In one example, this is done by the user adding hash tag(s) or other specifiers of the data type to use. Additionally or alternatively, the user tweaks the natural language of the requirements specification in order for the interpreter and schema generator to correct identify the data type as part of their processing.

Thus, once the schema is generated, it is available for validation. The client/user can check whether all of the tables and their respective columns are indicated correctly in the schema, and, if not, update the requirement file accordingly. In another example, the check reveals the combination is not supported and, instead of changing the requirements specification, the combination is added in the dictionary as a supported combination.

If the tables and columns are correct, the data type of the generated columns of each entity i.e. table are checked. If not, then this new data type is accommodated in the database specific dictionary and/or the requirements file is updated to correctly specify the datatype.

Once the refinement (e.g. 134, 138) is complete, the sequence of FIGS. 1A and 1B may be iterated to obtain an updated schema for execution. After another check (e.g. of valid data types, etc.) passes, the schema is ready to be executed.

Figure 2:
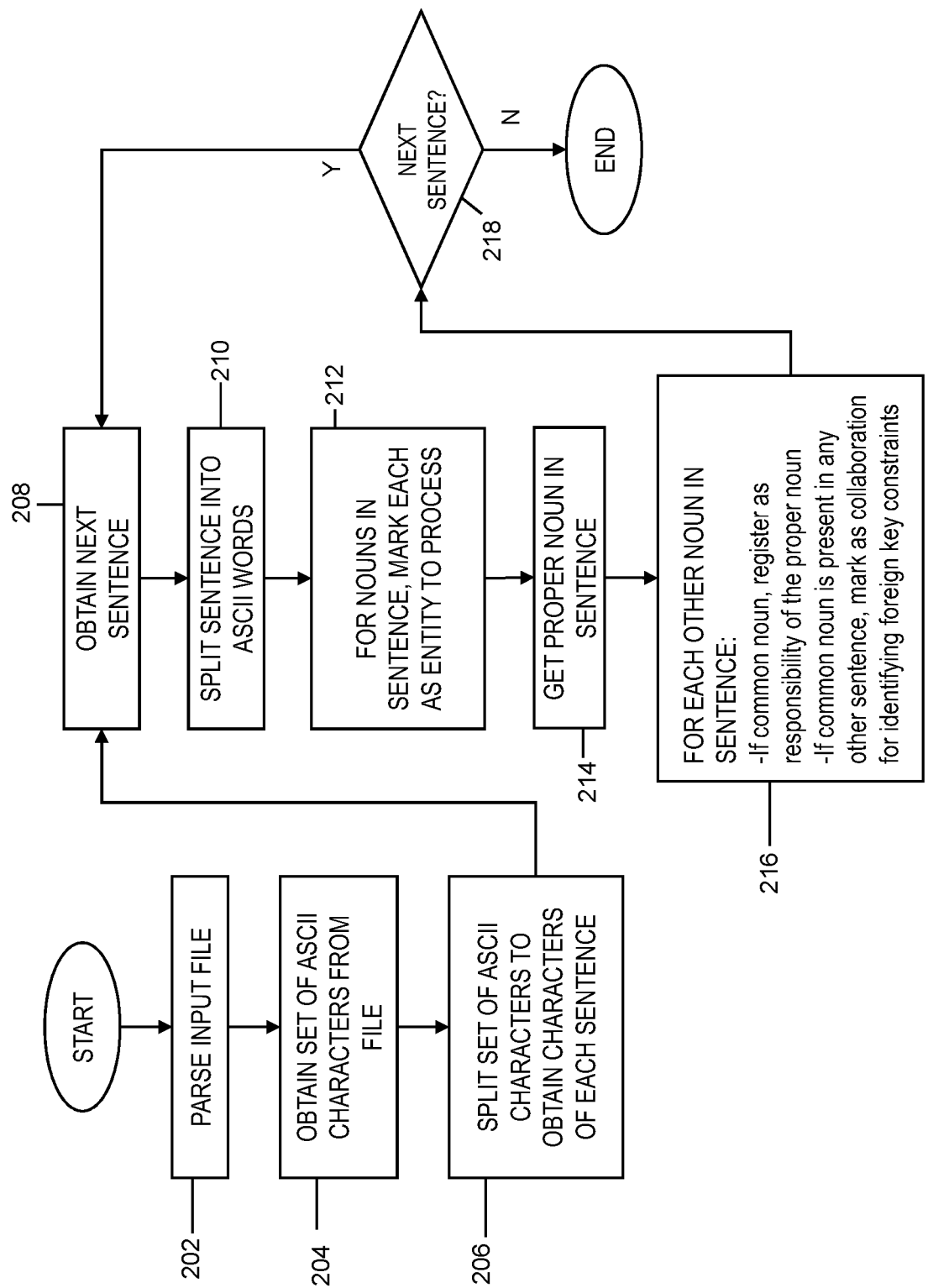
FIG. 2 depicts an example process for requirements specification interpretation to values of a character encoding, in accordance with aspects described herein.

Further details are provided about the database specific ASCII interpreter. The interpreter may include an ASCII dictionary for each of several types of databases (for instance Oracle, DB2, MySQL, etc.). FIG. 2 depicts an example process, for performance by such a component, for requirements specification interpretation to values of a character encoding, in accordance with aspects described herein. The component can, for instance, parse an input flat file (202) in simple text in any language as prepared by a requirements gathering team, and obtain ASCII characters present in that file (204). The set of ASCII characters can be split to obtain the characters in each sentence (206). The component can then iterate over the ASCII characters combination for each sentence. For instance, the component obtains a next sentence to process (208) and splits that sentence to obtain the ASCII character combination for each word (210). Then, it identifies nouns in that sentence as entities to process (212). The ASCII combination of each word can be compared with the database specific ASCII dictionary that may be built into, provided separate from, or accessed by the ASCII interpreter. The comparison can identify where any words of the sentence are a proper noun or a common noun. The process identifies the proper noun in the sentence (214), then performs 216: For each other noun in the sentence: If it is a common noun, the common noun is registered as a 'responsibility' of the proper noun. If such a common noun is present in another identified sentence, the common noun is marked as a 'collaboration' to later be identified as a foreign key constraint. After the proper noun of the sentence is identified, marked as an entity for a table, and the common nouns are identified, marked as responsibilities, and collaborations identified for that sentence (if applicable), the process determines whether there is a next sentence to process (218). If so (218, Y), the process returns to (208) to obtain the next sentence and process it accordingly. Otherwise (218, N), the process ends. Accordingly, the ASCII interpreter identifies all of the entities from the requirements specification, their responsibilities, and their collaborations with other entities. This information to may be passed for relational schema generation.

As described above, the ASCII interpreter finds a combination, searches for the database type, identifies the database specific dictionary, and checks whether the combination is present in the database specific ASCII dictionary. If not, it adds that combination into the ASCII dictionary.

Figure 3:
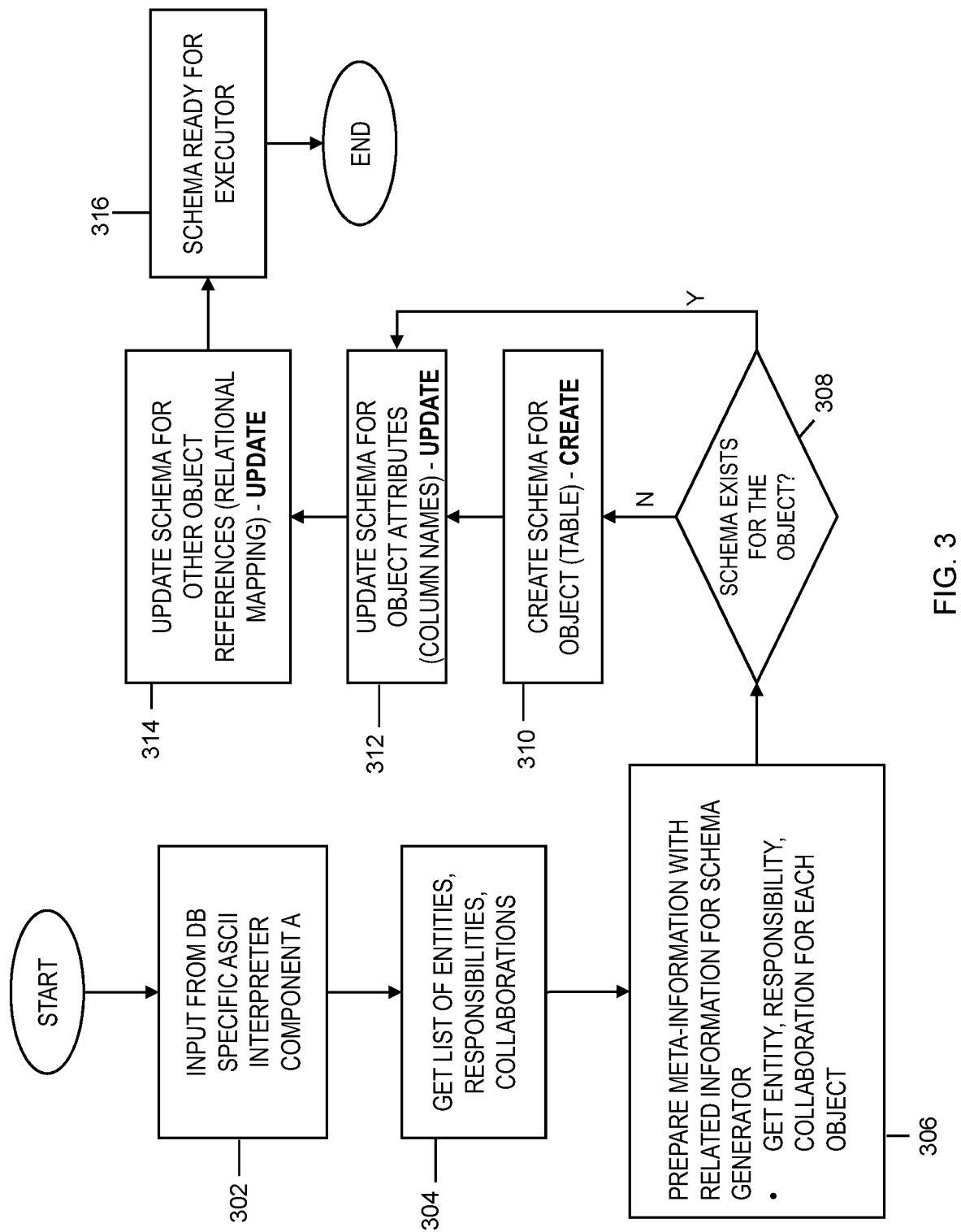
FIG. 3 depicts an example process for relational schema script generation, in accordance with aspects described herein.

A Relational Schema Generator in accordance with aspects described herein includes two components, a relational schema script generator and generated script executor. FIG. 3 depicts an example process for relational schema script generation, in accordance with aspects described herein. The relational schema generator takes the output from the interpreter ("component A") (302), identifies the list of entities, responsibilities and collaborations (304), and prepares the metadata with the related information such as all the entities required for the schema, their internal relationships, responsibilities and collaborations (306) for each object. This meta information can also indicate the type of database (e.g. whether it will be for Oracle, DB2, Sybase, MySQL, etc.). Based on this meta-information, the Generator component generates the schema.

The process checks whether an existing schema exists for the object (308). In this regard, existing schema or portions thereof may be retained and stored for possible use in later schema generation. If an existing schema for the object is not available (308, N), it creates the schema (310) with the information extracted from the interpreter. Then, or if the schema already exists (308, Y), the process updates the existing schema on the existing server for the object attributes (312) and for the other object references (relational mapping) (314). After this is done for each object, the relational schema has been generated it is ready for the executor component (316).

The generated script executor component takes input from the relational schema generator and identifies the server information, such as server type and server credentials, from the obtained meta-information. Based on the server type, the executor generates the bytecode of the script generated and output from the schema generator. After the bytecode is generated based on the server credentials, the executor generates the schema in the server for the database, including the entities as tables, their responsibilities (attributes) as columns, and the relationships between each table (foreign key constraints).

Figure 4:
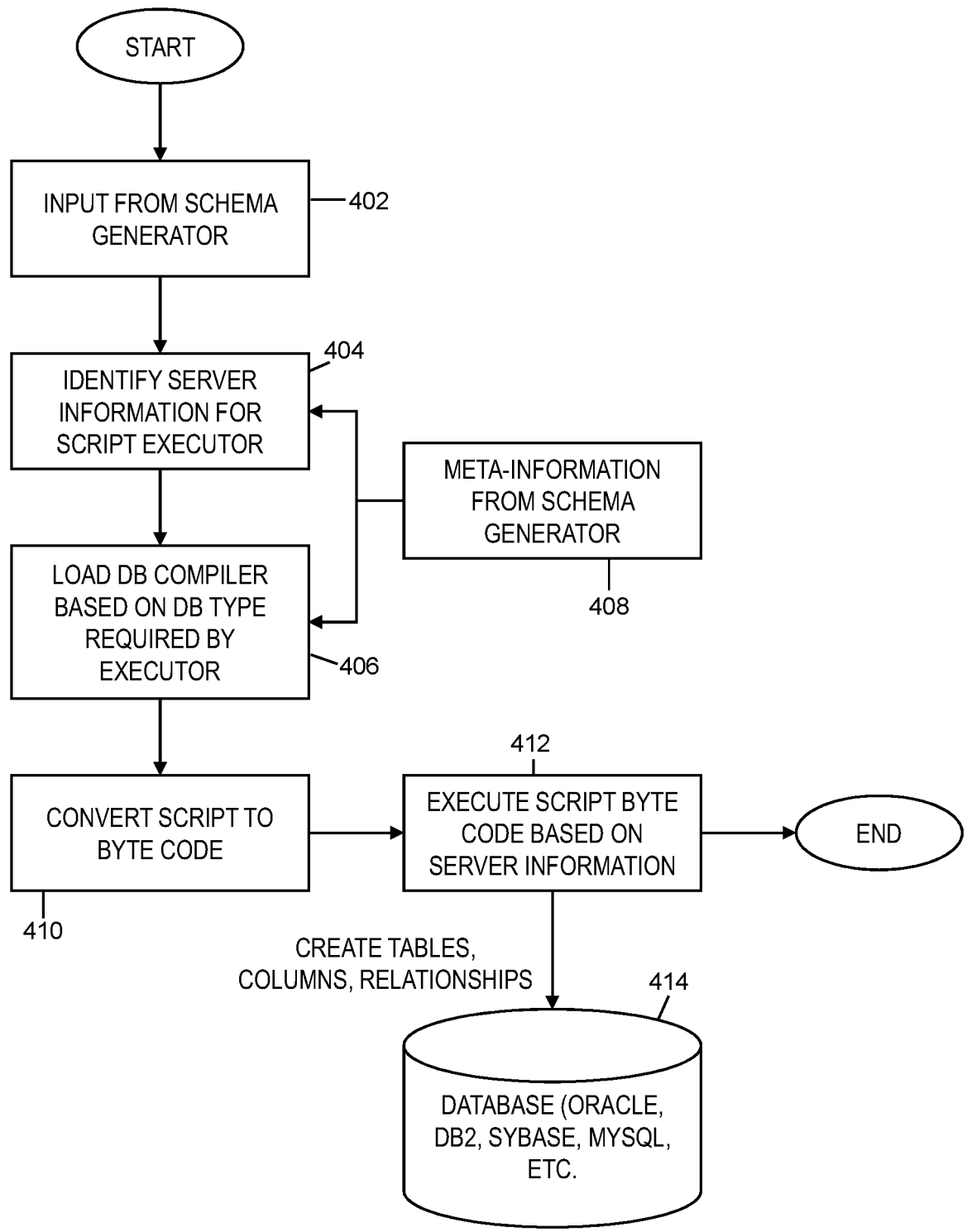
FIG. 4 depicts an example process for relational schema script execution, in accordance with aspects described herein.

FIG. 4 depicts an example process for relational schema script execution, in accordance with aspects described herein. The process receives input from the schema generator (FIG. 3) (402). The process identifies the server information (404) and loads the appropriate database compiler based on the database type required for the executor (406). This information is gleaned from the meta-information (408) from the schema generator. The process converts the schema to bytecode (410) for the script to be executed (412) based on the server information. As part of this, tables, columns, and relationships are created in the database (414). In some embodiments, the same computer system performs 402, 404, 406, 410 and 412, while in other embodiments, two or more computer systems perform aspects of FIG. 4 (for instance one system performs 402, 404, 406, 410 and sends the script to another computer system (e.g. a server hosting the database) to perform 412).

Hash tag hint features may be present in some embodiments. Support for hash tags in the requirements specification can provide immense additional capabilities to customize the requirements by, e.g., overriding the default rule set and/or specifying new rules on the go. In this regard, the interpreter can check for hash tags in the requirements specification in order to influence defaults that the interpreter would otherwise apply. Hints can be provided to dictate table names (proper noun entities), column names (attributes), datatypes, and/or any other desired information for the schema.

In addition, features provide an iterative model in that, when a package includes a requirements file, the customer, sales team, or other user(s) can navigate through the generated schema and effect desired updates to the schema by making the appropriate updates to the requirements file. Iteration occurs when the requirements file is re-interpreted and an updated schema is generated. The iterative model can be helpful to ensuring the appropriate database is generated without the need for unnecessary communications with the sales or technical team members to solicit the information.

History tracking features are also provided, in that baseline requirement/schema combinations can be established, and updated baselines can be established in a controlled manner. A client or sales team, as examples, can take an existing baseline, update a new feature by way of a requirements specification change, generate the updated schema, and iterate this generation until an appropriate updated schema is generated from the corresponding updated requirements specification. That updated requirements/schema package can then be set as an updated baseline. Baselining in this context is akin to a 'major revision' of the schema. Such revisions occur on any appropriate schedule, for instance every six months. This feature helps to track the history of changes, in the requirements, by clients or sales teams at the direction of the clients.

The following is a specific example requirements specification file with 5 sentences. In this example, the organization is an educational institution:

Schools have set of name, classes, teachers, students, non-teaching staff.
Classes have set of class, school, teachers, students, subjects.
Students have set of name, roll number, address, emergency contact, father's name, mother's name.
Subjects have subject name, teachers, class, student, midterm result, annual result.
Teachers have set of name, address, qualification, mobile number, class, subject, salary
Non-Teaching staff have set of name, qualification, mobile number, address, salary.

An example output after interpreting the above example requirements file is presented below. (FK) denotes that the column has a foreign key relationship to another table, and (PK) denotes Primary Key.

Figure 5A:
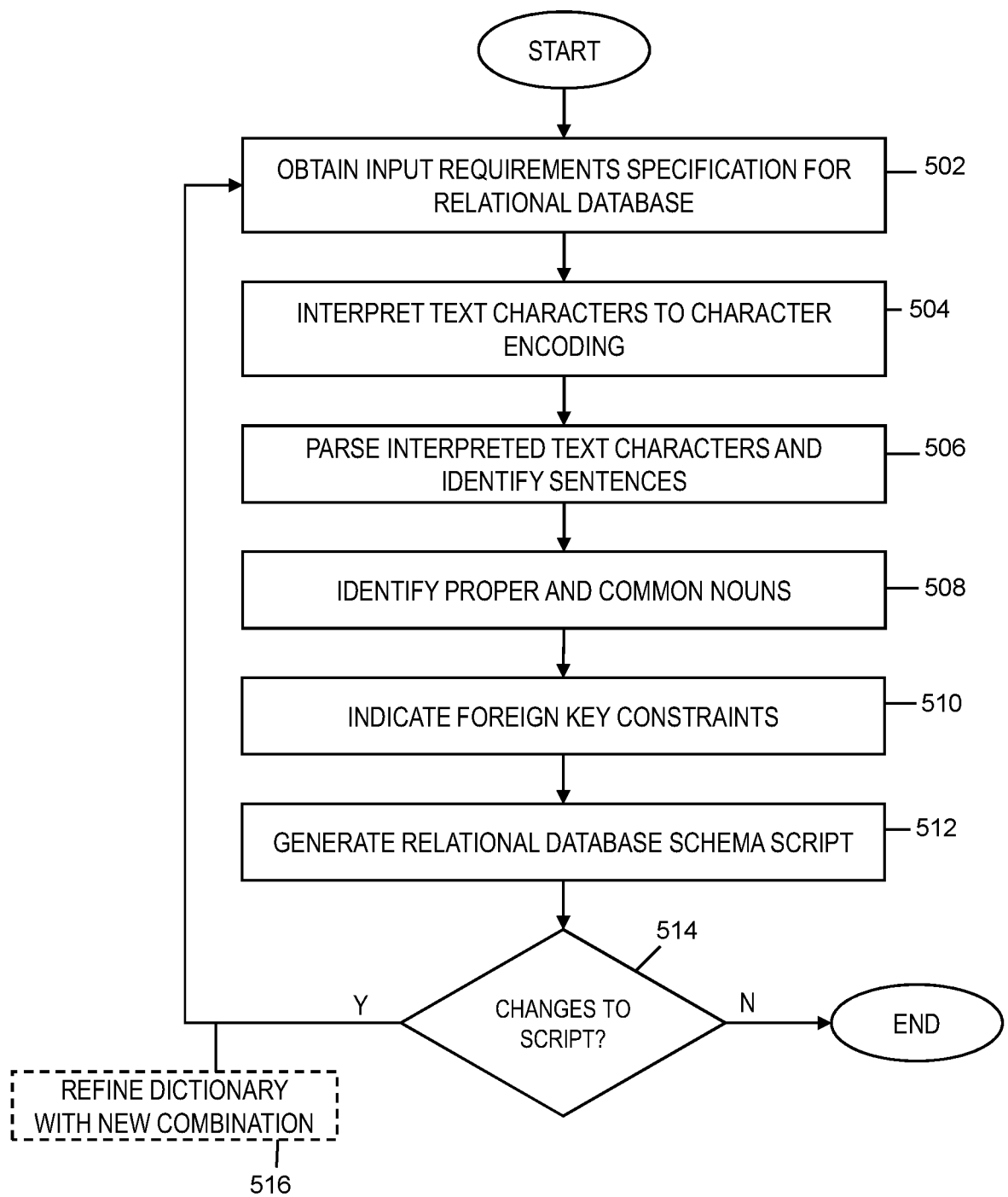
FIG. 5A depicts an example process for relational database schema generation, in accordance with aspects described herein.

Table name: School; Column names: Name of School, Class (FK), Teachers (FK), Students (FK), Non-teaching staff (FK)
Table name: Classes; Column names: Name of Class, School (FK), Teachers (FK), Students (FK), Subjects (FK)
Table name: Students; Column names: Name of Student, Roll number, Address, Emergency contact, Father's name, Mother's name Table name: Subjects; Column names: Name of Subject, Teachers (FK), Class (FK), Students (FK), Mid-term result, Annual result Table name: Teachers; Column names: Name of Teacher, Address, Qualification, Mobile number, Class (PK), Subject (FK), Salary Table name: Non-Teaching staff; Column names: Name of non-teaching staff, Address, Qualification, Mobile number, Salary FIG. 5A depicts an example process for relational database schema generation, in accordance with aspects described herein. In some examples, the process is performed by one or more computer systems, such as those described herein.

The process begins by obtaining an input requirements specification for a relational database to be generated (502). The process interprets text characters of the requirements specification as values of a predefined character encoding (504). The predefined character encoding is American Standard Code for Information Interchange (ASCII) character encoding in some embodiments, in which case the interpreting generates an ASCII value of each interpreted text character of the requirements specification.

The process continues by parsing the interpreted text characters and identifying complete sentences of the requirements specification (506). The process identifies, using an input dictionary that specifies combinations of character values of the predefined character encoding, proper nouns in the identified complete sentences and common nouns in the identified complete sentences (508). The dictionary can include an industry-specific dictionary selected based on an industry type that the relational database is to service.

The process indicates foreign key constraints (510) as between entities of the indicated entities based on appearance of particular common nouns in more than one of the identified complete sentences, and generates a relational database schema script for the relational database (512). In some examples, it generates the relational database schema script in a data definition language (DDL).

The process continues with an inquiry as to whether changes are to be made to the script (514). If not (514, N), the process ends. Otherwise, the process continues by iterating. In this case, the process returns to 504 after obtaining an updated requirements specification, for instance once that a user has updated. Using the updated requirements specification, the iterating iterates the (i) interpreting (504), (ii) parsing and identifying (506) complete sentences, (iii) identifying proper and common nouns (508), and (iv) generating (512) a relational database schema script. The iterating may be performed, in one example, based on recognizing an invalid datatype for an attribute of the indicated attributes, alerting the user, and then receiving the updated requirements specification in response to recognizing the invalid datatype and the user updating it.

Optionally, the process refines the dictionary, in which, based on encountering an unrecognized entity-attribute combination, the dictionary is updated to add the entity-attribute combination (516).

In a particular example, the process identifies a database adapter based on provided server information of a server to host the relational database. The database adapter is indicative of a database type for the relational database, and the process executes or initiates execution of the DDL based on the identified adapter, the execution to generate relational tables of the database in a database format for the database type.

Figure 5B:
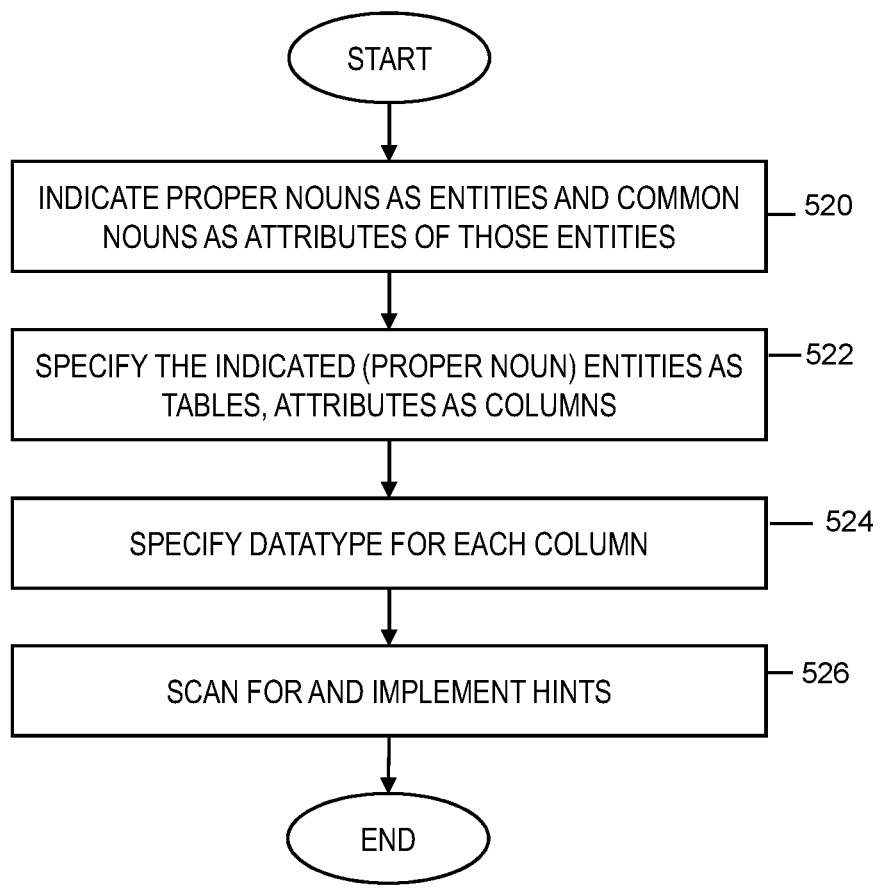
FIG. 5B depicts an example process for generating a relational database schema script for the relational database, in accordance with aspects described herein.

FIG. 5B depicts an example process for generating a relational database schema script (e.g. 512 of FIG. 5A) for the relational database, in accordance with aspects described herein. In some examples, the process is performed by one or more computer systems, such as those described herein.

The process indicates the identified proper nouns of the complete sentences as entities of the relational database and indicates the identified common nouns of the complete sentences as attributes of those entities (520). The process accordingly specifies, for the relational database schema, the indicated entities as respective tables of the relational database and the indicated attributes as respective columns in one or more of the tables of the relational database (522). The process specifies a datatype for each column of the respective columns (524) based on datatypes indicated in the dictionary. In this regard, based on no appropriate datatype being indicated in the dictionary as applying to an indicated attribute of the attributes, the process selects a default datatype for the column specified from the identified attribute. The process also scans the requirements specification for hints and implements them (526). This can include using an encountered hint as (i) an authoritative specification of an entity, an attribute, or a datatype, and/or (ii) an override of an entity, an attribute, or a datatype indicated by the generating.

Although various examples are provided, variations are possible without departing from a spirit of the claimed aspects.

Figure 6:
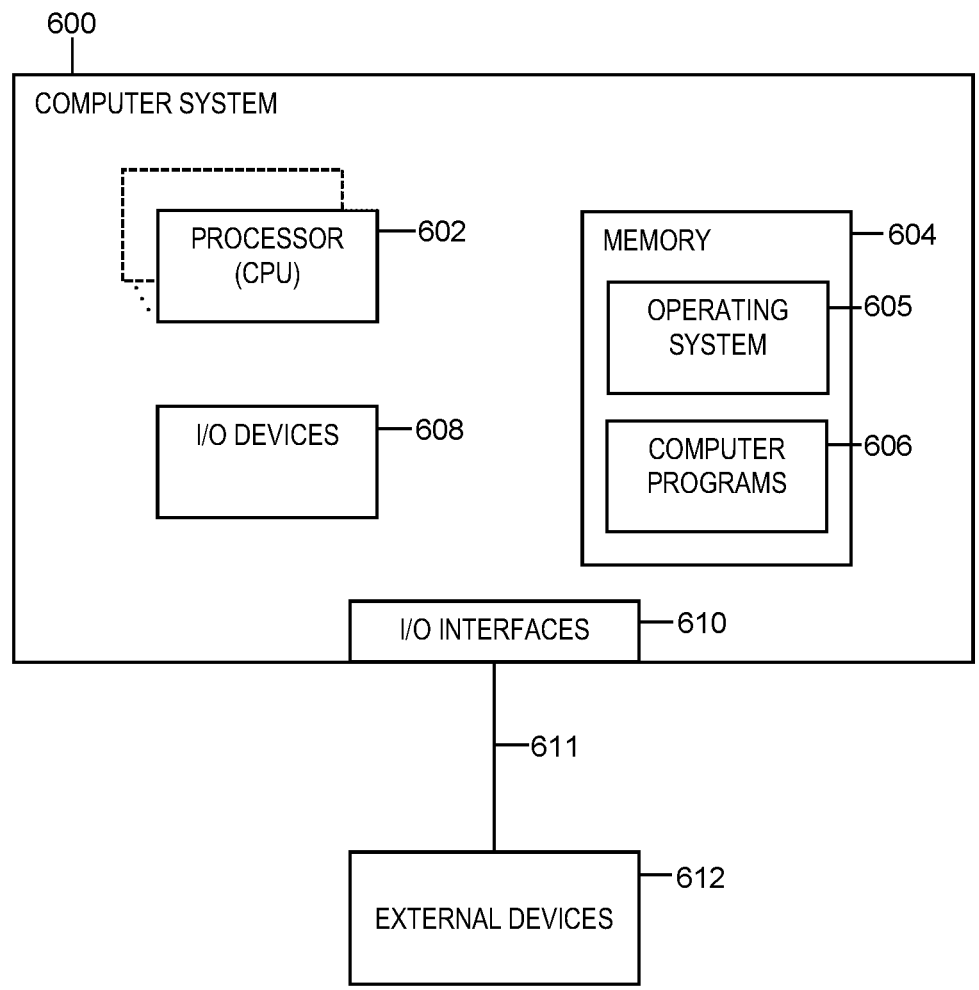
FIG. 6 depicts one example of a computer system and associated devices to incorporate and/or use aspects described herein.

Processes described herein may be performed singly or collectively by one or more computer systems. FIG. 6 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by International Business Machines Corporation (Armonk, N.Y., USA), Intel Corporation (Santa Clara, Calif., USA) or ARM Holdings plc (Cambridge, England, United Kingdom), as examples.

FIG. 6 shows a computer system 600 in communication with external device(s) 612. Computer system 600 includes one or more processor(s) 602, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 602 can also include register(s) to be used by one or more of the functional components. Computer system 600 also includes memory 604, input/output (I/O) devices 608, and I/O interfaces 610, which may be coupled to processor(s) 602 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 604 can be or include main or system memory (e.g. Random Access Memory) used in the execution of program instructions, storage device(s) such as hard drive(s), flash media, or optical media as examples, and/or cache memory, as examples. Memory 604 can include, for instance, a cache, such as a shared cache, which may be coupled to local caches (examples include L1 cache, L2 cache, etc.) of processor(s) 602. Additionally, memory 604 may be or include at least one computer program product having a set (e.g., at least one) of program modules, instructions, code or the like that is/are configured to carry out functions of embodiments described herein when executed by one or more processors.

Memory 604 can store an operating system 605 and other computer programs 606, such as one or more computer programs/applications that execute to perform aspects described herein. Specifically, programs/applications can include computer readable program instructions that may be configured to carry out functions of embodiments of aspects described herein.

Examples of I/O devices 608 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (612) coupled to the computer system through one or more I/O interfaces 610.

Computer system 600 may communicate with one or more external devices 612 via one or more I/O interfaces 610. Example external devices include a keyboard, a pointing device, a display, and/or any other devices that enable a user to interact with computer system 600. Other example external devices include any device that enables computer system 600 to communicate with one or more other computing systems or peripheral devices such as a printer. A network interface/adapter is an example I/O interface that enables computer system 600 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Wash., U.S.A.).

The communication between I/O interfaces 610 and external devices 612 can occur across wired and/or wireless communications link(s) 611, such as Ethernet-based wired or wireless connections. Example wireless connections include cellular, Wi-Fi, Bluetooth®, proximity-based, near-field, or other types of wireless connections. More generally, communications link(s) 611 may be any appropriate wireless and/or wired communication link(s) for communicating data.

Particular external device(s) 612 may include one or more data storage devices, which may store one or more programs, one or more computer readable program instructions, and/or data, etc. Computer system 600 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 600 may be operational with numerous other general purpose or special purpose computing system environments or configurations. Computer system 600 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
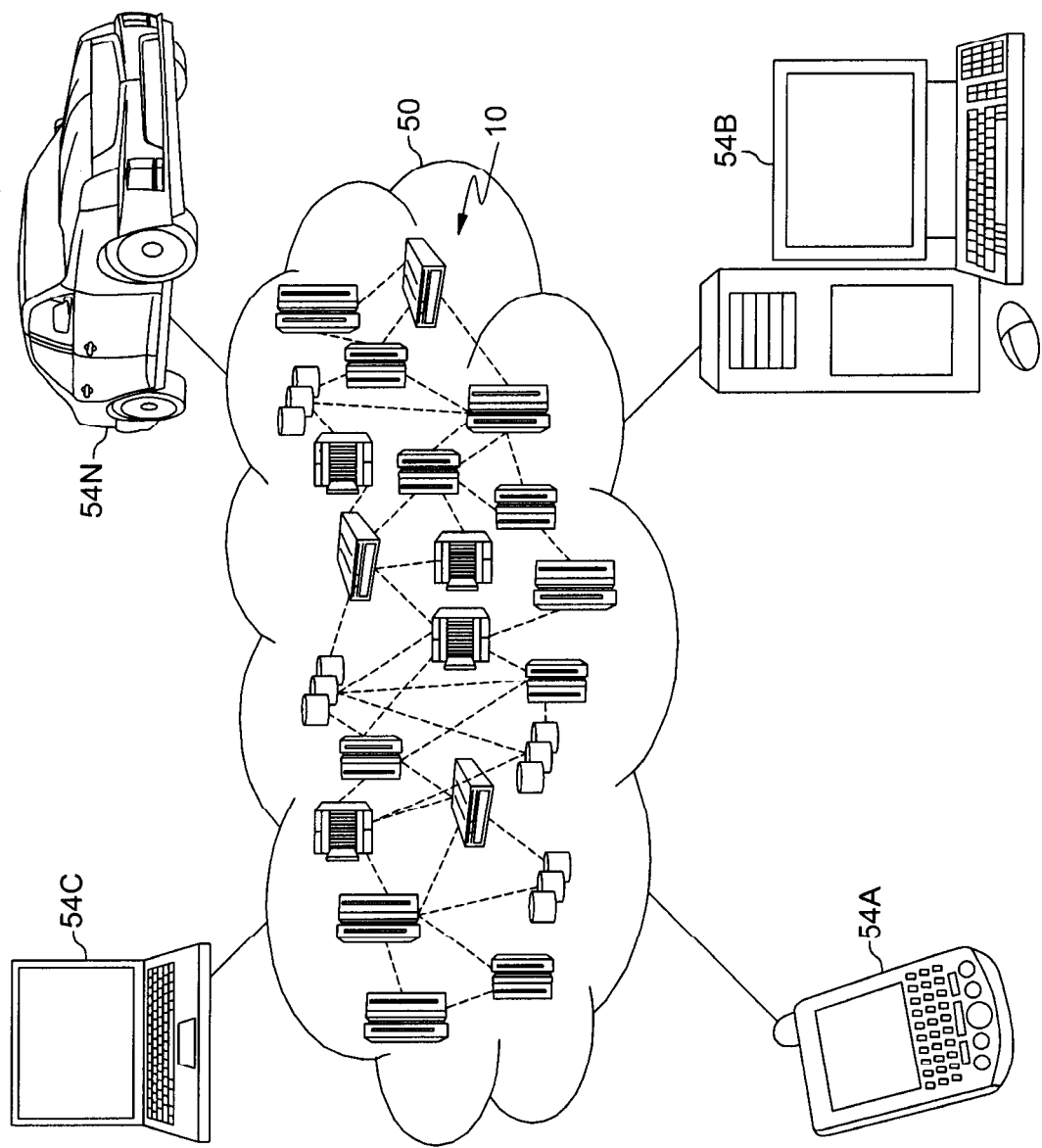
FIG. 7 depicts a cloud computing environment according to an embodiment of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
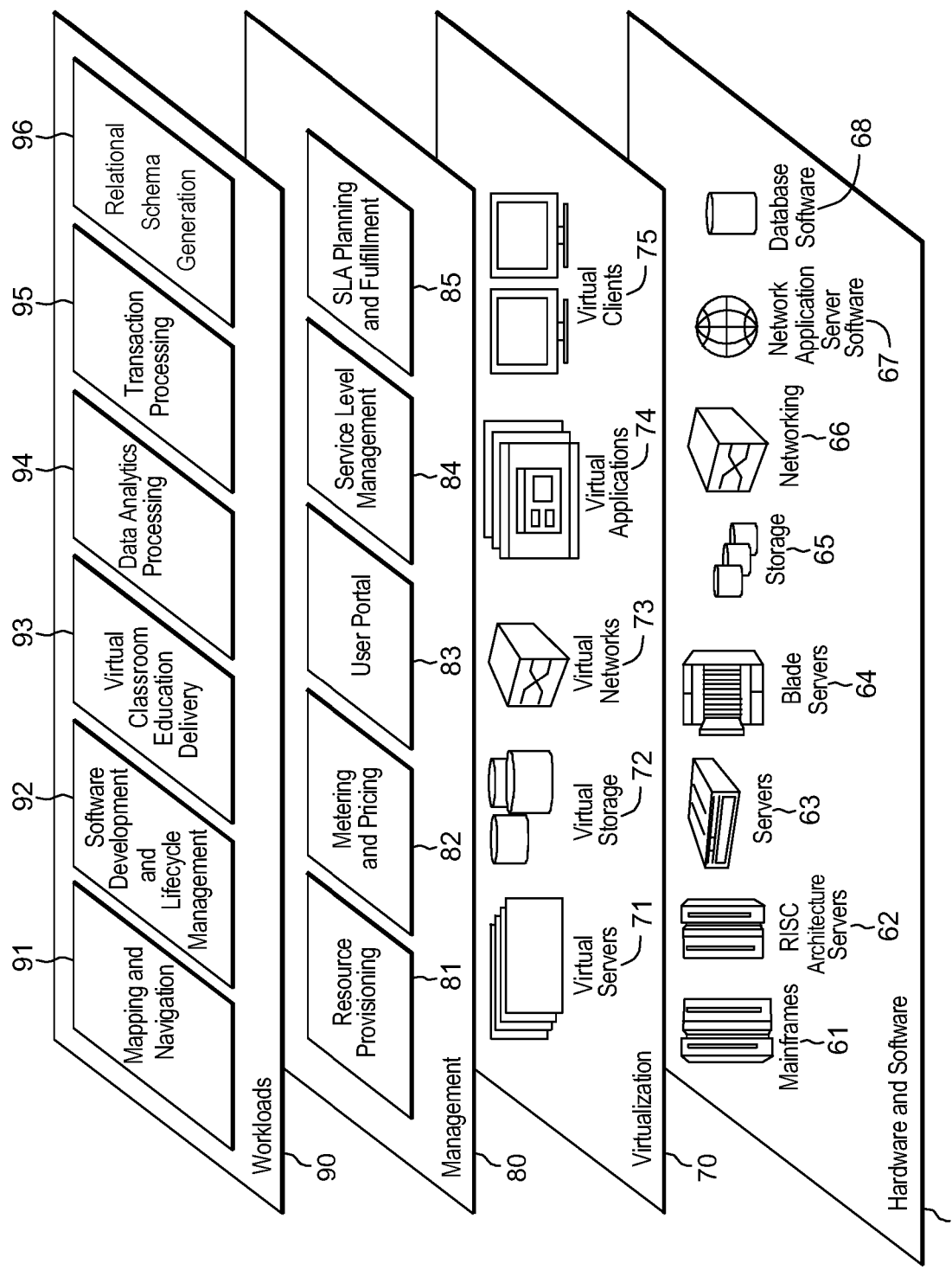
FIG. 8 depicts abstraction model layers according to an embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and relational schema generation 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
    obtaining an input requirements specification for a relational database to be generated;
    interpreting text characters of the requirements specification as values of a predefined character encoding;
    parsing the interpreted text characters and identifying complete sentences of the requirements specification;
    identifying, using an input dictionary that specifies combinations of character values of the predefined character encoding, proper nouns in the identified complete sentences and common nouns in the identified complete sentences; and
    generating a relational database schema script for the relational database, the generating comprising (i) indicating the identified proper nouns of the complete sentences as entities of the relational database and indicating the identified common nouns of the complete sentences as attributes of those entities, and (ii) indicating foreign key constraints as between entities of the indicated entities based on appearance of particular common nouns in more than one of the identified complete sentences.

2. The method of claim 1, wherein the generating further comprises specifying, for the relational database schema, the indicated entities as respective tables of the relational database and the indicated attributes as respective columns in one or more of the tables of the relational database.

3. The method of claim 2, wherein the generating further comprises specifying a datatype for each column of the respective columns based on datatypes indicated in the dictionary.

4. The method of claim 3, further comprising selecting, based on no datatype indicated in the dictionary applying to an indicated attribute of the attributes, a default datatype for the column specified from the identified attribute.

5. The method of claim 1, wherein the generating the relational database schema script comprises scanning the requirements specification for hints identified using a selected special character, wherein the generating uses an encountered hint as an override of a default entity, attribute, or datatype indicated by the generating.

6. The method of claim 1, wherein the generating the relational database schema script generates the relational database schema script in a data definition language (DDL).

7. The method of claim 6, further comprising:
    identifying a database adapter based on provided server information of a server to host the relational database, the database adapter indicative of a database type for the relational database; and
    initiating execution of the DDL based on the identified adapter, the execution to generate relational tables of the database in a database format for the database type.

8. The method of claim 1, wherein the dictionary comprises an industry-specific dictionary selected from a plurality of different available dictionaries, each specific to a respective different industry type, based on an industry type that the relational database is to service.

9. The method of claim 1, further comprising refining the dictionary, the refining comprising, based on encountering an unrecognized entity-attribute combination, updating the dictionary to add the entity-attribute combination.

10. The method of claim 1, further comprising iterating, using an updated requirements specification, the (i) interpreting, (ii) parsing and identifying complete sentences, (iii) identifying proper and common nouns, and (iv) generating a relational database schema script, based on recognizing an invalid datatype for an attribute of the indicated attributes and on receiving the updated requirements specification in response to recognizing the invalid datatype.

11. The method of claim 1, wherein the predefined character encoding is American Standard Code for Information Interchange (ASCII) character encoding, and the interpreting generates an ASCII value of each interpreted text character of the requirements specification.

12. A computer system comprising:
    a memory; and
    a processor in communication with the memory, wherein the computer system is configured to perform a method comprising:
        obtaining an input requirements specification for a relational database to be generated;
        interpreting text characters of the requirements specification as values of a predefined character encoding;
        parsing the interpreted text characters and identifying complete sentences of the requirements specification;
        identifying, using an input dictionary that specifies combinations of character values of the predefined character encoding, proper nouns in the identified complete sentences and common nouns in the identified complete sentences; and generating a relational database schema script for the relational database, the generating comprising indicating the identified proper nouns of the complete sentences as entities of the relational database and indicating the identified common nouns of the complete sentences as attributes of those entities, and (ii) indicating foreign key constraints as between entities of the indicated entities based on appearance of particular common nouns in more than one of the identified complete sentences.

13. A computer program product comprising:
a computer readable storage medium readable by a processing circuit and storing instructions for execution by the processing circuit for performing a method comprising:
obtaining an input requirements specification for a relational database to be generated;
interpreting text characters of the requirements specification as values of a predefined character encoding;
parsing the interpreted text characters and identifying complete sentences of the requirements specification;
identifying, using an input dictionary that specifies combinations of character values of the predefined character encoding, proper nouns in the identified complete sentences and common nouns in the identified complete sentences; and
generating a relational database schema script for the relational database, the generating comprising indicating the identified proper nouns of the complete sentences as entities of the relational database and indicating the identified common nouns of the complete sentences as attributes of those entities, and (ii) indicating foreign key constraints as between entities of the indicated entities based on appearance of particular common nouns in more than one of the identified complete sentences.

14. The computer system of claim 12, wherein the generating further comprises specifying, for the relational database schema, the indicated entities as respective tables of the relational database and the indicated attributes as respective columns in one or more of the tables of the relational database, and specifying a datatype for each column of the respective columns based on datatypes indicated in the dictionary.

15. The computer system of claim 12, wherein the generating the relational database schema script comprises scanning the requirements specification for hints identified using a selected special character, wherein the generating uses an encountered hint as an override of a default entity, attribute, or datatype indicated by the generating.

16. The computer system of claim 12, wherein the dictionary comprises an industry-specific dictionary selected from a plurality of different available dictionaries, each specific to a respective different industry type, based on an industry type that the relational database is to service.

17. The computer program product of claim 13, wherein the generating further comprises specifying, for the relational database schema, the indicated entities as respective tables of the relational database and the indicated attributes as respective columns in one or more of the tables of the relational database, and specifying a datatype for each column of the respective columns based on datatypes indicated in the dictionary.

18. The computer program product of claim 13, wherein the generating the relational database schema script comprises scanning the requirements specification for hints identified using a selected special character, wherein the generating uses an encountered hint as an override of a default entity, attribute, or datatype indicated by the generating.

19. The computer program product of claim 13, wherein the dictionary comprises an industry-specific dictionary selected from a plurality of different available dictionaries, each specific to a respective different industry type, based on an industry type that the relational database is to service.

* * * * *